United States Patent
De Haan

(10) Patent No.: US 8,165,398 B2
(45) Date of Patent: Apr. 24, 2012

(54) METHOD AND DEVICE FOR HANDWRITING DETECTION

(75) Inventor: Ido Gert De Haan, Assen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 937 days.

(21) Appl. No.: 12/129,740

(22) Filed: May 30, 2008

(65) Prior Publication Data

US 2009/0297028 A1    Dec. 3, 2009

(51) Int. Cl.
G06K 9/18    (2006.01)
G06K 9/22    (2006.01)
G06K 9/00    (2006.01)

(52) U.S. Cl. ......... 382/186; 382/314; 382/187; 382/188

(58) Field of Classification Search .................. 382/186, 382/187, 188, 314
See application file for complete search history.

(56) References Cited

U.S. PATENT DOCUMENTS

| | | | | |
|---|---|---|---|---|
| 5,517,579 A * | 5/1996 | Baron et al. | | 382/187 |
| 5,835,635 A * | 11/1998 | Nozaki et al. | | 382/226 |
| 2002/0065104 A1 | 5/2002 | Hess et al. | | |
| 2002/0067350 A1 | 6/2002 | Ben Ayed | | |
| 2002/0145596 A1 * | 10/2002 | Vardi | | 345/179 |
| 2003/0007018 A1 * | 1/2003 | Seni et al. | | 345/864 |
| 2005/0110778 A1 * | 5/2005 | Ben Ayed | | 345/179 |
| 2006/0126946 A1 | 6/2006 | Denoue et al. | | |
| 2007/0080931 A1 | 4/2007 | Chen et al. | | |
| 2007/0182595 A1 * | 8/2007 | Ghasabian | | 341/22 |
| 2008/0111710 A1 | 5/2008 | Boillot | | |
| 2008/0309621 A1 * | 12/2008 | Aggarwal et al. | | 345/173 |
| 2009/0066660 A1 * | 3/2009 | Ure | | 345/173 |
| 2009/0187814 A1 * | 7/2009 | Raff | | 715/205 |
| 2009/0219250 A1 * | 9/2009 | Ure | | 345/169 |

FOREIGN PATENT DOCUMENTS

EP    1596321 A2    11/2005
JP    10171589 A    6/1998

OTHER PUBLICATIONS

Milner, B, "Handwriting recognition using acceleration-based motion detection", Mar. 25, 1999, pp. 5/1-5/6.
International Search Report for corresponding application No. PCT/EP2008/065434 dated Feb. 4, 2010.

* cited by examiner

*Primary Examiner* — Bhavesh Mehta
*Assistant Examiner* — Utpal Shah
(74) *Attorney, Agent, or Firm* — Renner, Otto, Boisselle & Sklar, LLP

(57) ABSTRACT

The invention relates to a method for handwriting detection using a handwriting tool (2) being arranged for communicating with a further device (2) and comprising the following steps: recognizing characters using detection of movements carried out by means of said handwriting tool (2); determining the probability factor of at least one input character corresponding to a given character; and using said probability factor in a step for correction, completion and prediction of words being formed by said characters. The invention also relates to a device for such handwriting detection.

8 Claims, 3 Drawing Sheets

METHOD AND DEVICE FOR HANDWRITING DETECTION

FIELD OF THE INVENTION

The present invention relates to a method and device for handwriting detection using a handwriting tool being arranged for communicating with a further device.

BACKGROUND ART

Today, there exist many types of electronic devices such as mobile telephones, media players, palmtop computers etc. Mobile devices such as mobile telephones, for example, are normally equipped with a function called short message service (also known as "sms", or "teletext"), i.e. a communications protocol forming part of the GSM system and allowing transmission of relatively short text messages between such mobile telephones.

According to known technology, such sms messages (or "text messages") can be composed and entered by the user into the mobile telephone by using a keypad forming part of the telephone. This means that characters such as letters, digits and other symbols are entered into the telephone manually by pressing the corresponding keys on the keypad.

Characters can be entered using the keypad in different ways. A common way is the so-called multi-tap method of inputting text. This method is based on the principle that each key of the keypad is associated with a number of characters and that the user selects a particular character by pressing the relevant key a corresponding number of times.

Another common way of inputting characters is by using the so-called T9 method. T9 stands for "Text on 9 keys", and is a method which is used for predicting words which are input by using the keypad. The purpose of the T9 method is to simplify the typing of text messages in mobile telephones and is based on the principle that a user may press a key just once for each letter (as opposed to the multi-tap method, in which a user may have to press a key multiple times). Furthermore, the T9 method uses a database with a dictionary of words in a manner so that when typing a word, the dictionary is used to look up the words which correspond to an intended word, i.e. in the form of an entered sequence of entered keys. It has been found that the T9 method can speed up the process of writing messages via a keypad. Also, users of the T9 method may add their own customized words in the database.

A development of the T9 system is the so-called XT9 system, which comprises certain additional features. For example, the XT9 system uses information relating to which keys are close to each other. In this manner, words which are misspelled as a result of a user hitting a wrong key which is a neighbour to an intended key can be corrected in an improved manner.

An alternative to a keypad when entering characters forming an input text is by using a so-called stylus, i.e. a pointed, pencil-like writing tool which is used in many of today's mobile telephones for entering characters by "writing" on a touch sensitive screen forming part of the telephone. Such a combination of a stylus and a "writing pad" in the form of a touch sensitive screen is now common and can sometimes be regarded as more user-friendly than entering characters manually via a keypad.

An important principle with this method of entering characters using a stylus is that it requires a control unit and software adapted for character recognition, i.e. in order to detect each letter being entered by means of the handwriting procedure. A problem with handwriting detection and character recognition is the risk of misspelled words and wrongly detected characters due to the style of handwriting being used by the person who is writing. There is therefore a need to correct any incorrectly input characters in an easy and efficient manner.

Also, even though the above-mentioned known methods of entering information are relatively straight-forward for a user of a mobile device such as a mobile telephone, there is an increasing demand in the mobile telephone market for even more easy, quick and user-friendly ways of operating a mobile telephone. In particular, there is a need for faster, easier and more intuitive ways of composing sms messages, mms messages, e-mail messages and similar. In particular, there is a need for quick and simple methods of correction of any occurring misspellings of input text when using a handwriting tool such as for example a stylus.

SUMMARY OF THE INVENTION

With the above and following description in mind, an aspect of certain embodiments of the present invention is to provide a headset for example for handheld, portable devices such as a mobile telephone, in which the above-mentioned drawbacks can be overcome, and which can be used for providing a more user-friendly and effective way of entering information into such a device than previously known and for correcting misspellings of input text.

By means of the invention, there is provided a method for handwriting detection using a handwriting tool being arranged for communicating with a further device and comprising the following steps: recognizing characters using detection of movements carried out by means of said handwriting tool; determining the probability factor of at least one input character corresponding to a given character; and using said probability factor in a step for correction, completion and prediction of words being formed by said characters.

By means of the invention, there is also provided a device for handwriting detection comprising a handwriting tool being arranged for communicating with a further device and wherein: said handwriting tool is arranged for recognizing characters using detection of movements carried out by means of said handwriting tool; said device comprising a character recognition unit for determining the probability factor of at least one input character corresponding to a given detected character; and being arranged for using said probability factor for correction, completion and prediction of words being formed by said characters.

The invention leads to certain advantages. Primarily, it can be noted that it provides a more simple user interaction and that it fulfills the need for faster, easier and more intuitive inputting of information, such as composing of sms messages and similar.

According to an embodiment of the invention, the step of recognizing of characters can be carried out by using at least one accelerometer being arranged in said handwriting tool.

Also, said step for correction, completion and prediction of words which are to be formed by said characters is preferably of the T9/XT9 type, or similar.

Furthermore, said handwriting tool can be arranged for communicating with said further device via a wireless connection.

Furthermore, the headset is suitably associated with a further device in the form of a mobile telephone, portable computer or similar communication device. Also, said output signals are suitably used for inputting characters forming sms messages, mms messages, e-mail messages or the like.

Furthermore, the headset can be arranged for communicating with said further device via a wireless connection. The wireless connection is suitably arranged in accordance with the Bluetooth wireless protocol. According to a further embodiment, the headset may be arranged for communicating with the further device via a wired connection.

Furthermore, it should be emphasised that the term "comprising" or "comprises", when used in this description and in the appended claims to indicate included features, elements or steps, is in no way to be interpreted as excluding the presence of other features elements or steps than those expressly stated.

BRIEF DESCRIPTION OF THE DRAWINGS

The invention will now be described in more detail with reference to certain embodiments and to the attached drawings, in which.

DETAILED DESCRIPTION OF A PREFERRED EMBODIMENT

Figure 1:
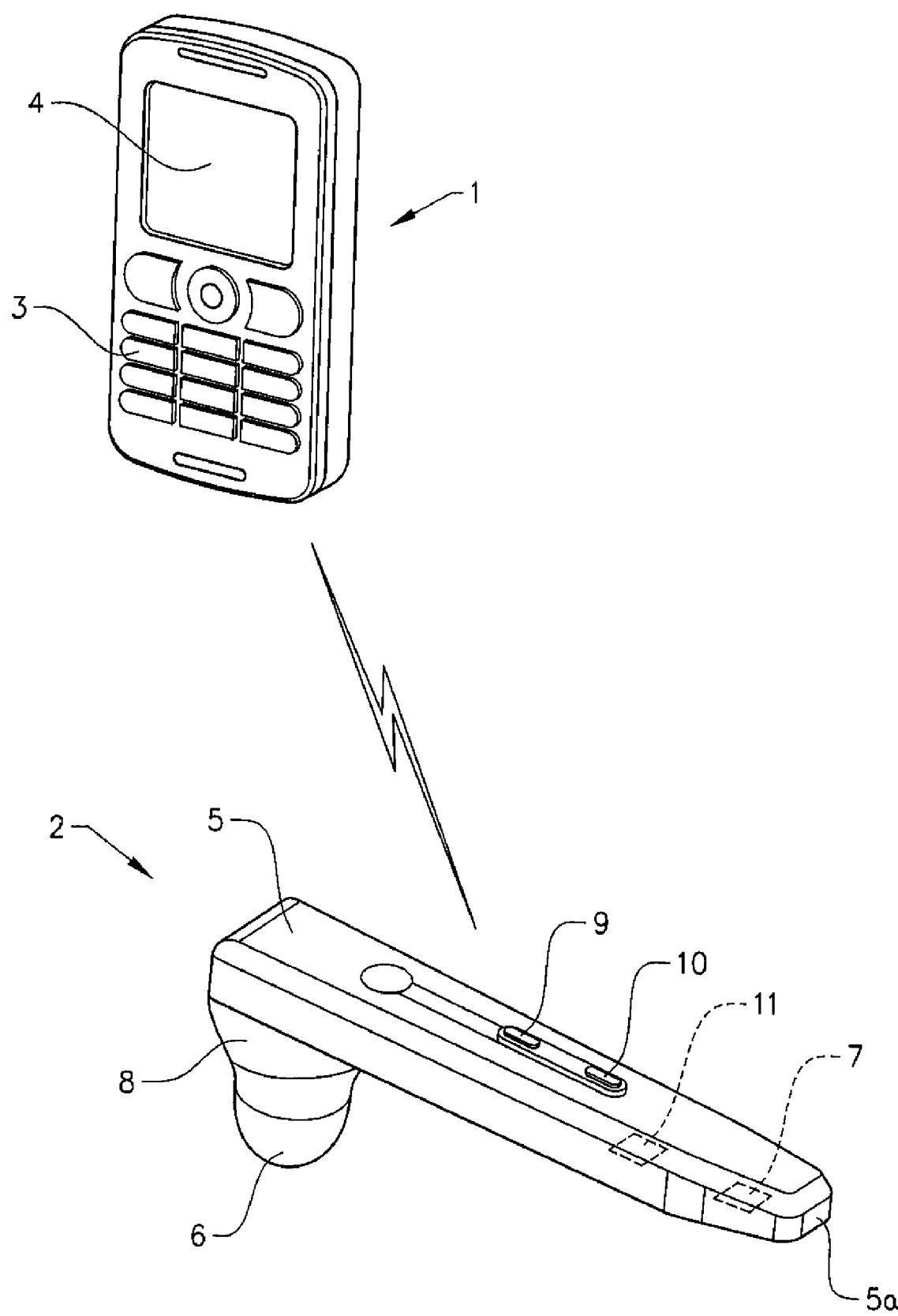
FIG. 1 shows a schematic view of a device in which the invention is implemented, comprising a mobile telephone communicating with a headset which is designed so as to be used also as a handwriting tool.

With reference to FIG. 1, there is shown a schematic view of a handheld, portable mobile telephone 1 being associated with and communicating with a headset 2. It should be mentioned that the invention is not limited to be used in mobile telephones only. The principles of the invention may equally well be applied, for example, in devices such as palmtop computers, electronic game units, media players and similar devices.

In a conventional manner, the mobile telephone 1 shown in FIG. 1 is provided with a keypad 3 and a display 4. The mobile telephone 1 is also arranged for communicating with the headset 2. As indicated schematically in FIG. 1, the communication between the mobile telephone 1 and the headset 2 may be wireless, by means of a wireless communications protocol such as for example the Bluetooth wireless protocol. The manner in which different units communicate via the Bluetooth protocol is previously known as such, and for this reason it will not be described in detail here.

According to an alternative embodiment, the headset can be connected to the mobile telephone via a wired communication line, i.e. the invention is not limited to the field of wireless communication between a headset and a further unit.

According to the embodiment shown in FIG. 1, the invention is designed in a manner so that the headset 2 is used as a handwriting tool and is arranged for character recognition by detecting movements of the headset 2 corresponding to handwriting and for providing output signals corresponding to such movements. In this manner, characters in an input text can be recognized. This will be described in greater detail below.

As shown in FIG. 1, the headset 2 comprises a housing 5 which is suitably elongated, i.e. having a design with notably more length than width. Furthermore, the housing 5 carries an earphone 6, i.e. a small loudspeaker unit, and a microphone 7. The earphone 6 is placed at the end section of a protruding part 8 which is arranged for being positioned in the ear of a person (not shown) who is using the headset 2. Also, the microphone 7 is arranged for being positioned relatively close to the person's mouth during use.

The headset 2 is suitably designed to be supported on a person's ear during telephone calls. This is achieved just by positioning the protruding part 8 with the earphone 6 inside the person's ear. However, although not shown in FIG. 1, the headset 2 may comprise a fastening element, for example in the form of an ear loop device, for fastening the entire headset more tightly on either one of a person's left or right ear (not shown), if this should be needed.

The headset 2 is shown in FIG. 1 in a slightly simplified manner. It is apparent that a headset 2 such as the one shown in FIG. 1 may comprise user interface controls such as buttons, switches and similar components. As an example of such a user interface control, a first button 9 and a second button 10 are shown. The buttons 9, 10 are examples of controls forming part of a user interface, or a man-machine interface (MMI). According to the embodiment, the first button 9 can be used for decreasing the volume in the earphone 6, and the second button 10 can be used for increasing the volume in the earphone 6.

It should also be mentioned that the manner in which the headset 2 communicates with the mobile telephone 1 during normal telephone calls, for example, is previously known as such. For this reason, it is not described in greater detail here.

As mentioned initially, in the field of handheld and mobile devices such as mobile telephones, there is a need for increased user-friendliness and speed for example when entering information for example for an sms message or an e-mail message. In particular, there is a need for more effective methods for character recognition and also for correction, completion and prediction of handwritten words. Existing methods, for example based on a stylus cooperating with a touchscreen, are not always sufficiently easy and quick to use.

With the above in mind, it is noted that the invention is arranged so that it is provided with means for character recognition using a handheld handwriting tool such as the headset 2. More precisely, the headset 2 according to the embodiment shown in FIG. 1 is suitably provided with an accelerometer for identifying movements of the headset 2 corresponding to writing-like movements and for transforming such detected movements into characters, symbols or other information to be fed into the mobile telephone 1 and used for example for the sms service. Such an accelerometer is indicated schematically by means of reference numeral 11 in FIG. 1.

According to the shown embodiment, the housing 5 is shaped generally as a pen, i.e. having an elongated design with a pointed end portion 5a similar to the tip of a pencil. However, the invention is not limited to any particular type of shape or design of the housing 5. Generally speaking, the invention is not limited to the use of a headset as a writing tool. In fact, any handwriting tool based on character recognition, preferably by means of accelerometer-based technology or similar, can be used within the frame of the invention.

The manner in which the accelerometer 11 is arranged so that headset 2 can be used as a writing tool will now be described with further reference to FIG. 2, which is a block diagram of a number of components forming part of the headset 2 and the mobile telephone 1 of the above-mentioned type.

Figure 2:
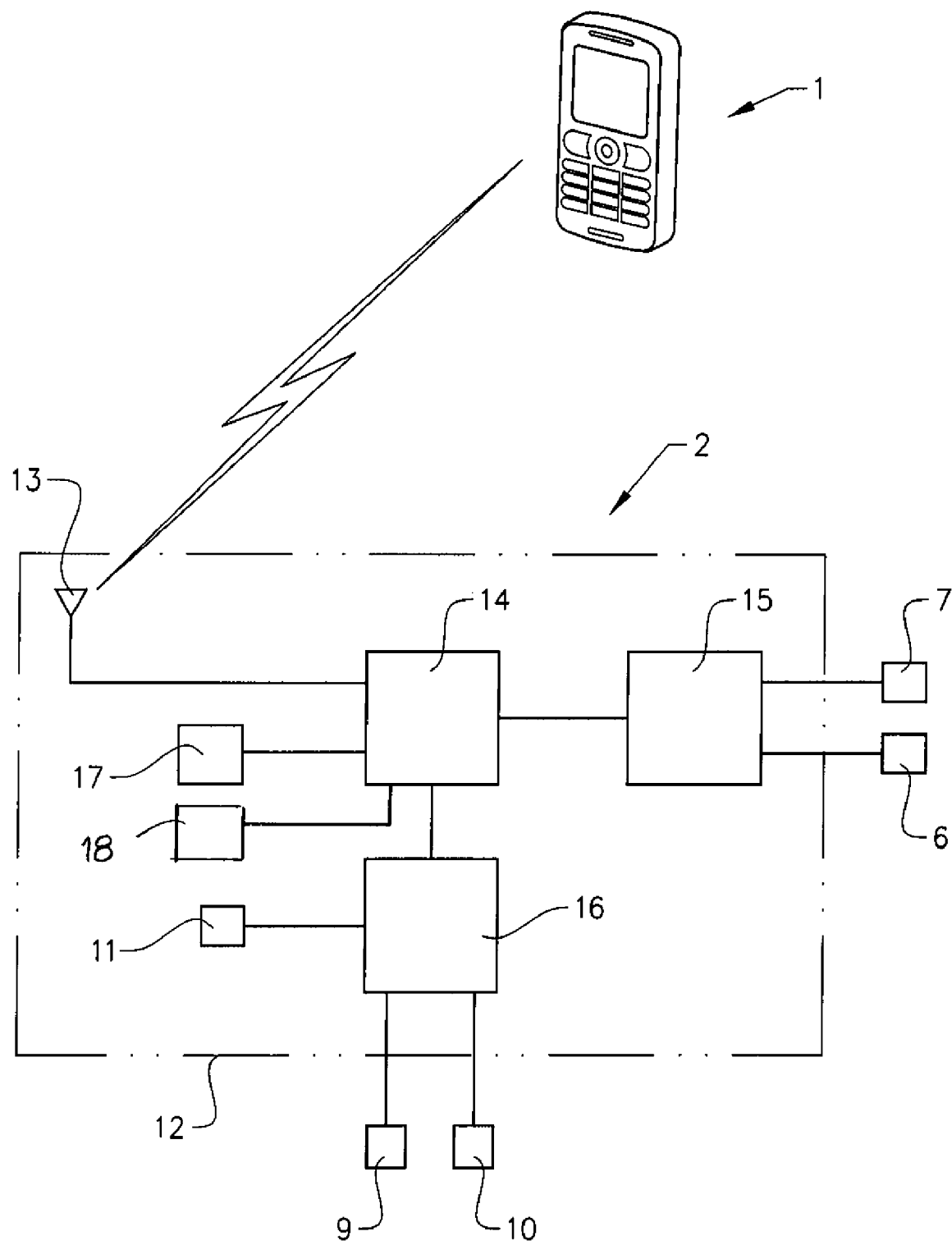
FIG. 2 is a schematical block diagram of a headset and a mobile telephone being designed in accordance with the invention for handwriting detection.

FIG. 2 shows a block diagram of a headset control unit 12 which is preferably mounted as an integrated unit inside the housing 5 of the headset 2. The control unit 12 comprises an antenna 13 which is arranged for communicating with the mobile telephone 1, suitably via the Bluetooth wireless protocol as mentioned above. The antenna 13 is connected to a microprocessor 14 arranged for controlling the transmission of signals between the headset 2 and the mobile telephone 1. Furthermore, the microprocessor 14 is connected to an audio interface 15, arranged for receiving audio signals from the microphone 7 and for feeding audio signals to the earphone 6. The microprocessor 14 is also connected to an I/O (input/output) unit 16, to which the above-mentioned two buttons 9, 10 are connected.

Furthermore, the above-mentioned accelerometer 11 is connected to the I/O unit 16. The accelerometer 11 is used for providing input signals indicating movements of the housing 5 along a generally horizontal plane (x and y directions) or alternatively movements both along a horizontal plane and also along a vertical direction (z direction), i.e. transversal to both the x and y directions. Such signals can be used in order to detect a pattern of movement of the headset 2. More precisely, when a user moves the headset 2 in a fashion similar to writing with a pencil, the accelerometer 11 will output a signal corresponding to the direction of movement and the acceleration of the movement. This signal is fed to the microcontroller 14 and is used to recognize characters, numbers and other symbols corresponding to such "writing" movements of the headset 2.

In order to recognize and identify which symbols correspond to the movements of the headset 2, the microcontroller 14 is suitably connected to a character recognition unit 17 for translating the signals from the accelerometer 11 corresponding to the movements of the headset 2 (i.e. the "writing" movements by means of the headset 2) into corresponding symbols and other pieces of information.

According to the embodiment, the character recognition is based on a method for correction, completion and prediction of words such as the T9 method, which was described initially. The T9 method allows a user to enter text messages letter by letter in a manner wherein a prediction is carried out of a completed word after entering a number of characters. The T9 method was developed by the company Tegic Communications, and is well known to the skilled person. For this reason, it is not described in detail here.

In order to use the T9 method, the headset control unit 12 comprises a database unit 18 with a large number of words to be used when running the T9 program. This database unit 18 is connected to the microcontroller 14 and is used together with the T9 method for looking up words which correspond to an entered sequence of letters or characters as they are "written" into the mobile telephone 1 by means of the headset 2. As an example only, the T9 method can be used in a manner so that when a user has written the three letters "m o o", the database 18 can be arranged so that the word "moon" is suggested to the user as a candidate word by displaying it on the display 4 of the mobile telephone 1.

Since the invention is arranged for handwriting detection using character recognition, there is a risk that there will be errors in the detection of the detected characters. For example, an "E" can be interpreted as an "F" or a "B". In order to minimize the risk that the wrong words are predicted and completed, the invention is arranged so that it comprises a step of determining the probabilities that a certain input character corresponds to a given character.

To this end, the database unit 18 as mentioned above comprises a set of information wherein, for each character which is possible to be detected, there is stored a number of alternative characters including information regarding the probability that the alternative character in question has in fact been entered by the user. For an example, regarding detection of the letter "A", the database unit 18 can comprise stored information which relates to the probability factor that the "A" is in fact an "A", and also the probability factor that it is another letter. For example, there could be a first probability factor of 95% that the detected letter is in fact an "A", a second probability factor of 80% that the detected letter is an "R", and a third probability factor of 65% that the detected letter is an "N".

Similar sets of information could be stored for each character (letters, figures, symbols etc.) for which the handwriting detection is arranged for.

Furthermore, the information relating to the probability factors as mentioned above will be used in the prediction method, which suitably is a T9 or an XT9 type of algorithm as mentioned above. Suitably, the invention is arranged so that the probability factors for a certain word which is being input as a sequence of letters are added together and used as a total probability factor which is used when determining which word to be suggested by the T9 method. Other ways of combining the probabilities of the input characters than by addition can also be used. Generally, the invention uses a suitable algorithm using contributions from each of the probability factors when determining which word to be chosen from the database and being presented as a candidate for the intended word.

As an example, it can be assumed that when the user intends to write a word such as "CARD", there will be a set of information stored in the database unit 18 which is based on certain probability factors (the percentages below are examples only):

First letter ("C")
  probability factor "C": 90%.
  probability factor "D": 80%
  probability factor "O": 50%
Second letter ("A")
  probability factor "A": 90%.
  probability factor "R": 65%
  probability factor "K": 55%
Third letter ("R")
  probability factor "R": 90%.
  probability factor "A": 70%
  probability factor "K": 55%
Fourth letter ("D")
  probability factor "D": 90%
  probability factor "O": 80%
  probability factor "K": 50%

When using these recognized letter "C", "A", "R" and "D", the character recognition unit 17 will preferably use the sum of all the probability factors when determining which word to suggest "CARD" as the intended word by means of the T9 method. In this case, the total probability factor was 90+90+90+90 equals 360.

If a certain word has been suggested as a candidate word based on the input letters and their probability factors, but the user is of the opinion that this was not the intended word, the user may (by pressing a button for example) discard the presented candidate word. With the use of the probability factors above, the recognition unit 17 may select another word such as "DARK", since the sum of the probability factors for the letters "D", "A", "R" and "K" is 80+90+90+50 equals 310. In this example, this sum is the second highest in priority as calculated by means of the probability factors.

Also, if a user intended to type the word "DARKEST", the algorithm will automatically suggest "DARKE" after typing the last "E", despite the lower probability score, because this is the only correct match with the database.

Preferably, the embodiment is arranged to use a limited number of characters (for example 3-5 characters) which are ranked based on the probability factor. If, for example, a top 10 ranking is used for each character, the number of combinations will probably be too large for the recognition unit 17 to suggest a candidate word within a reasonable amount of time.

The microcontroller 14 of the headset 2 is arranged for outputting and transmitting to the mobile telephone 1 signals corresponding to information being formed by the characters and symbols detected from the movements of the headset 2. For this reason, the mobile telephone 1 is arranged for receiving the signals from the headset 2, preferably via the Bluetooth protocol as described above. The signals from the headset 2 are used as input information in the form of characters or symbols to various functions of the mobile telephone 1. For example, the input information can be used for composing an sms message, an mms message, an e-mail or similar.

The accelerometer 11 can be of conventional type and being, for example, of capacitive, piezoelectric or piezoresistive type. An accelerometer to be used within the frame of this invention is generally arranged to sense and convert an external acceleration force acting on the housing 5 and being detected from a motion. Such motion would result from movement of the housing 5 in a manner similar to writing with a pencil. Due to the shape of the housing (cf. FIG. 1), it can be held with a grip just like a pencil so that the end part 5a of the housing 5 would simulate a tip of a pencil. When writing the message (such as when composing an sms message), the user will hold the headset in one hand and have it positioned in a hand similar to a ballpoint pen.

An accelerometer of the 2D type, i.e. indicating movements only in a plane (above defined as an x-y plane), is suitably used. In such a case, the writing movements of the headset 2 along a generally horizontal plane (not shown) can be detected. Such a situation would correspond to a user "writing" with the headset 2 on a surface such as a table or a separate writing pad. As an alternatively, the mobile telephone 1 can be equipped with a screen having dimensions and a design allowing it to be used as a writing pad. This means that the user would use the headset 2 for writing movement directly on such a screen. Alternatively, the accelerometer can be of the 3D type, which means that also movement in a z direction, i.e. "up and down", can be detected.

By means of detecting acceleration in each of the two or three axes (depending on whether the accelerometer is of the 2D or 3D type), the headset will be able to identify individual characters based on the movements of the headset made by the user.

Consequently, the invention is based on the combination of handwriting detection and a predictive word correction and completion method, preferably the T9 method or similar. The predictive method uses a character recognition step in which the written, detected character is classified with a probability factor. Information regarding the probability factors for a written word is stored in the database unit 18. Furthermore, the character recognition unit 17 uses the information regarding probabilities in the database unit 18 in order to recognize which word (T9-based) to choose as the correct word to be suggested to the user.

Figure 3:
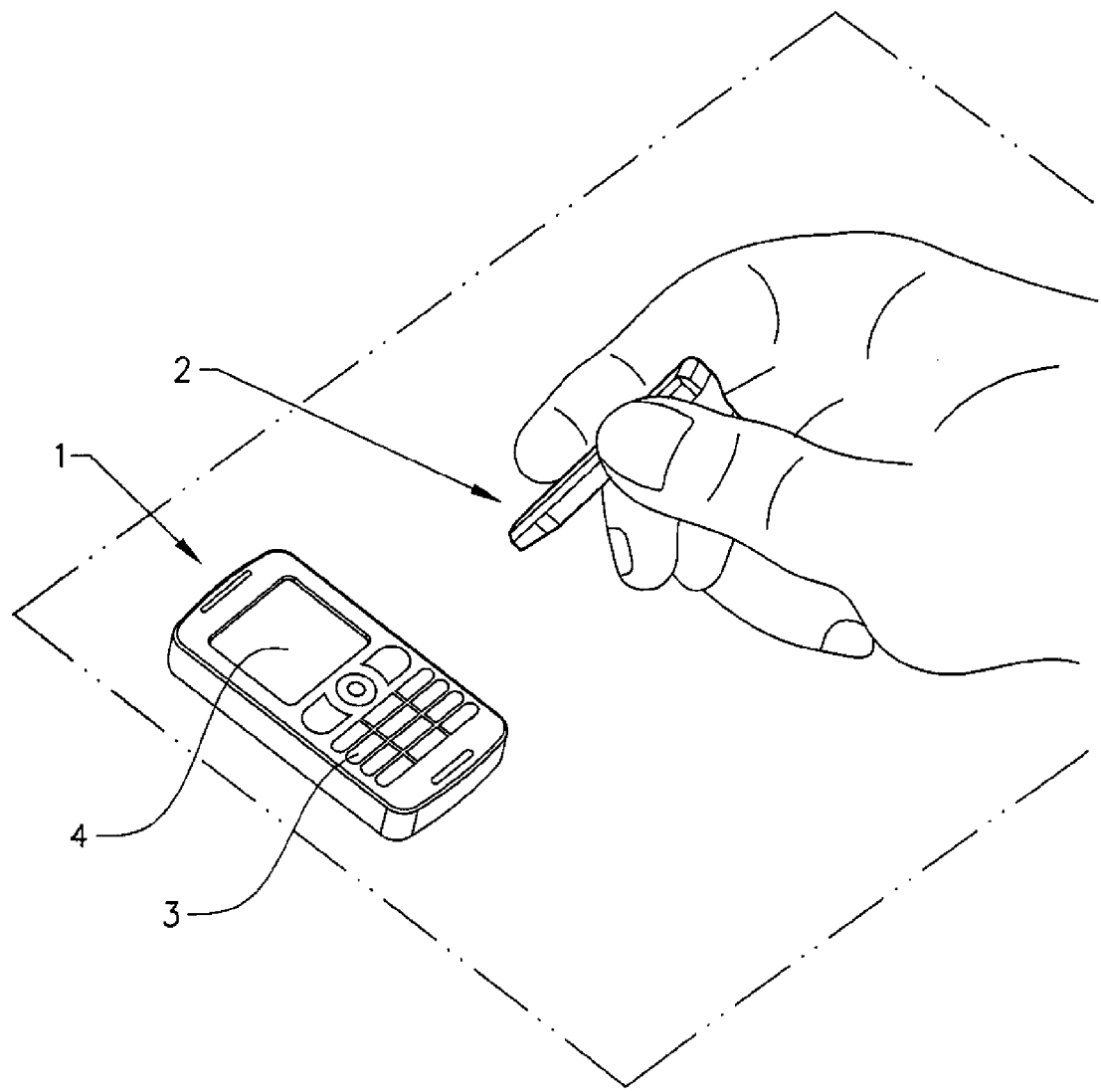
FIG. 3 is a perspective view of a user using the invention.

FIG. 3 is a perspective view of a headset 2 according to an embodiment of the invention, being in use. Accordingly, FIG. 3 shows the headset 2 being held in the hand of a user and being gripped generally in the same manner as a pencil. As described above, the headset 2 is suitably held so that it is pointed towards a surface on which the mobile telephone 1 is placed.

As described above, the headset 2 is arranged for detecting and converting writing-like movements into characters and symbols. This can be achieved if the headset 2 is used to "write" onto a surface, as shown in FIG. 3, or if it is used for making such movements in the air, i.e. without contacting any surface. Alternatively, the headset 2 can also be used for writing on a surface such as a screen on a mobile telephone.

While composing messages as described above, the characters are suitably shown in real-time on the display 4 of the mobile telephone 1 (eg. in the SMS composing window).

As mentioned, the character recognition is carried out preferably by using an accelerometer-based writing tool. According to the shown embodiment, a headset is used as a writing device which can convert the motion of writing-like movements into characters and symbols to be used as input information to a mobile unit such as a mobile telephone. Such information can be used for example in an sms message, an mms message or an e-mail message. The information can also be used for example for entering information via a web browser. Furthermore, the invention uses an accelerometer-based "pen", suitably in the form of a headset, and is arranged for handwritten character recognition and also for analyzing and determining the probability of a certain character.

It should be mentioned that the inventive concept could be implemented where a user would write on a surface or in-the-air. If a surface is used, the invention could be implemented generally independently of which type of surface is used.

The invention is not limited to the embodiment described above, but may be modified without departing from the scope of the claims below. For example, the invention can suitably be used in portable, handheld terminals such as mobile telephones, but is not limited to this type of use only but can be used in computers and other devices where there is a need for inputting and recognizing characters by means of movement similar to hand-writing.

In the case of wireless communication, it can be noted that the invention can be implemented using Bluetooth technology or any other type wireless technology.

Furthermore, it should be mentioned that the interpretation of the movement data, as detected by the accelerometer 11, can be done by algorithms inside the headset control unit 12, i.e. in the recognition unit 17 but can also be done by algorithms in the mobile telephone 1. According to the embodiment described above, the raw data from the headset 2 (when used as a handwriting tool) is processed in the headset control unit 12 as explained above. Alternatively, it is possible to use the headset 2 (again, when used as a handwriting tool) to just generate a stream of raw data which is then processed in a control unit in the actual mobile telephone. However, such an alternative embodiment is not shown in the drawings.

According to an alternative embodiment of the invention, it can be implemented in a headset of a type which only comprises an earphone, i.e. which is not provided with a microphone. Such a headset may be used together with a game unit, a media player or an FM radio, for example, where there normally is no need for inputting audio signals via a microphone in the headset.

Furthermore, according to yet another alternative embodiment, the handwriting tool according to the invention can be based on other principles of detection than the accelerometer-based method and device as described above. Accordingly, optical technology can be used for detection of input letters and other characters.

The invention is not limited to sms messages or similar, but can be used for further functions such as e-mail and input text for internet browsing. The principles of the invention can also be used when inputting characters into a notepad or a calendar.

The invention claimed is:

1. A method for handwriting detection using headset wirelessly connected to a mobile phone, wherein a user performs writing movements with the headset to represent characters for text entry into the mobile phone, the method comprising:
 performing character recognition on the movement of the headset to determine a list of characters possibly represented by the headset movement, the list of characters containing at least one character;
 determining a probability factor for each character in the list of characters, wherein the probability factor represents the probability that the respective character in the list of characters corresponds to the movement of the headset; and
 predicting words formed by the writing movements based on the probability factors of the character in the list of characters, wherein the predicted words may comprise a greater number of symbols or different symbols than the at least one character.

2. A method according to claim 1, wherein the headset comprises at least one accelerometer, and the headset movement is detected by the accelerometer.

3. A method according to claim 1, wherein the predicting words is performed according to a T9/XT9 method.

4. The method according to claim 1, wherein the predicted words are inputted as text into the mobile phone.

5. A device for handwriting detection comprising a headset wirelessly connected to a mobile phone, the headset comprising:
 a motion sensor, wherein the motion sensor detects movement of the headset;
 the mobile phone comprising:
  a character recognition unit, wherein the character recognition unit determines a probability factor of at least one character corresponding to movement of the headset; and
  a word predicting unit, wherein the word predicting unit predicts words formed by the at least one character based on the probability factor of the at least one character and the predicted words may comprise a greater number of symbols or different symbols than the at least one character.

6. The device according to claim 5, wherein the motion sensor comprises at least one accelerometer.

7. The device according to claim 5, wherein the word predicting unit is configured to perform a T9/XT9 method.

8. The device according to claim 5, wherein the predicted words are inputted as text into the mobile phone.

* * * * *

UNITED STATES PATENT AND TRADEMARK OFFICE
CERTIFICATE OF CORRECTION

| | | |
|---|---|---|
| PATENT NO. | : 8,165,398 B2 | |
| APPLICATION NO. | : 12/129740 | |
| DATED | : April 24, 2012 | |
| INVENTOR(S) | : Ido Gert De Haan | |

It is certified that error appears in the above-identified patent and that said Letters Patent is hereby corrected as shown below:

Column 9 line 2 currently reads "A method for handwriting detection using headset wire-" and should be replaced with -- A method for handwriting detection using a headset wire- --.

Column 9 line 15 currently reads "on the probability of factors of the character in the list of" and should be replaced with -- on the probability of factors of the characters in the list of --.

Signed and Sealed this
Twenty-sixth Day of June, 2012

David J. Kappos
*Director of the United States Patent and Trademark Office*